Patented Sept. 6, 1927.

1,641,411

UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

CELLULOSE-ACETATE COMPOSITION.

No Drawing. Application filed April 27, 1925. Serial No. 26,307.

This invention relates to cellulose acetate compositions of low inflammability. One object of the invention is to provide a cellulose acetate composition the inflammability of which is reduced to an important extent so that it becomes relatively safe, even in the film, lacquer and plastic arts. Another object is to provide a composition which may be made into transparent, strong, flexible films that are substantially waterproof, are unaffected by ordinary photographic baths, combine low inflammability with practical freedom from color and possess, in short, the desired properties of a support for sensitive photographic coatings. Still another object of my invention is to produce a composition which may be used in film, varnish or plastic manufacturing without injury to or being injured by the substances with which it is associated during manufacture, storage or use. Further objects will hereinafter appear.

I have found that cellulose acetate compositions having the desirable qualities enumerated above can be obtained by mixing cellulose acetate, preferably of the acetone-soluble type, with a brom-nucleo substitution product of the hydrocarbons $C_{2n}H_{n+3}$ and their homologues, where $n$ is 5 or more, such as the various brominated naphthalenes and anthracenes. The mixture should be effectively neutral, that is, concentration of free acid in the mixture should be insufficient to break down the substitution product or liberate bromine therefrom. Moreover, the substitution product should be substantially free from uncombined bromine and hydrobromic acid. While various brom substitution products of said series may be employed, either alone or mixed with each other, I prefer to employ alpha monobrom-naphthalene, but it will be understood that my invention is not restricted to this particular substance, except as indicated in the appended claims.

I have found that such compositions of cellulose acetate and brom substitution products of said hydrocarbons have a surprising degree of practical non-inflammability, that is, unexpected slowing down of the propagation of combustion therein. Films embodying such compositions, when ignited, often go out and must be reignited repeatedly during the tests, the flame traveling along the film very slowly. I have found some compositions containing these brom substitution products to burn two or three times more slowly than similar compositions containing corresponding chlor substitution products. Moreover, during the comparative tests the brom composition has to be reignited several times whereas the chlor composition does not.

Films embodying such compositions not only possess this remarkable slow-burning quality, but are effectively colorless when the proper precautions are taken. By effectively colorless I mean that their color is less than that permitted by the customary film manufacturing tolerances. The primary precaution to avoid color is to use brom substitution products free from uncombined bromine and hydrobromic acid. Another precaution is to produce a mixture effectively neutral, as hereinabove explained.

In the preferred form of my invention I dissolve, by way of example, 100 parts by weight of acetone-soluble cellulose acetate in 300 to 500 (say 400) parts of acetone, along with 5 to 30 parts of alpha bromonaphthalene. Such a mixture has the proper viscosity and other characteristics for use in the manufacture of films by the customary procedure. In it the ingredients are, of course, thoroughly mixed to form a homogeneous flowable solution, which is filtered if desired.

When more flowable solutions are desired, or when the compositions are to be used as lacquers, the volatile solvent may be increased, or volatile non-solvents, such as benzol, alcohol and the like may be added, as will be understood by those skilled in the art. While I prefer the relatively simple formula given above, I may add one or more organic bodies of only slight volatility which enhance the plasticity or flexibility of articles formed from the compositions and regulate the deposition of films from the solution, but such bodies are not essential. Examples of them are amyl or butyl acetate, the various amyl alcohols, the various butyl alcohols, and mixtures of them.

Films prepared from the hereinabove compositions are flexible, smooth, transparent and suitable for photographic purposes. Moreover, the absence of free bromine and free hydrobromic acid initially and throughout the useful life of the films, prevents injury to any photographic coatings and prevents discoloration of the composition. Of course, a small amount of a substance which absorbs bromine (like dicyandiamine) and blends with the other ingredients of the film without injuring the coating may be incorporated in the compositions as an insurance against trouble, but this is unnecessary when the above described precautions are taken with reasonable care.

Having thus described my invention, what I claim as new and desire to secure by Letters Patent is:

1. An effectively neutral composition of matter comprising cellulose acetate and a compound selected from the group of the monobrominated naphthalenes and anthracenes which is substantially free from uncombined bromine and hydrobromic acid.

2. An effectively neutral composition comprising cellulose acetate, a compound selected from the group of the monobrominated naphthalenes and anthracenes which is substantially free from uncombined bromine and hydrobromic acid and a solvent common to said ingredients.

3. A flowable film-forming composition comprising cellulose acetate, a compound selected from the group of the monobrominated naphthalenes and anthracenes which is substantially free from uncombined bromine and hydrobromic acid, an organic body of only slight volatility that enhances the flexibility of the films, and a volatile solvent common to all said ingredients.

4. A composition of matter which is effectively neutral and colorless and comprises cellulose acetate and alpha bromonaphthalene substantially free from uncombined bromine and hydrobromic acid.

5. A flowable film-forming composition which is effectively neutral and colorless, comprising acetone-soluble cellulose acetate, alpha bromonaphthalene substantially free from uncombined bromine and hydrobromic acid and a volatile liquid solvent common to said ingredients.

6. As an article of manufacture a flexible, transparent, effectively colorless film comprising cellulose acetate and a compound selected from the group of the monobrominated naphthalenes and anthracenes, substantially free from uncombined bromine and hydrobromic acid.

7. As an article of manufacture an effectively colorless flowed film which is substantially inert toward photographic coatings, which comprises acetone-soluble cellulose acetate and alpha bromonaphthalene which is substantially free from uncombined bromine and hydrobromic acid.

Signed at Rochester, New York this 25th day of April 1925.

STEWART J. CARROLL.